US012726113B2

(12) United States Patent
Sankaranarayanan et al.

(10) Patent No.: US 12,726,113 B2
(45) Date of Patent: Sep. 1, 2026

(54) MODULATION OF SWITCHING INTERVALS OVER A LINE CYCLE IN A MULTILEVER INVERTER

(71) Applicant: THE REGENTS OF THE UNIVERSITY OF COLORADO, Denver, CO (US)

(72) Inventors: Vivek Sankaranarayanan, Broomfield, CO (US); Robert Erickson, Broomfield, CO (US)

(73) Assignee: The Regents of the University of Colorado, Denver, CO (US)

( * ) Notice: Subject to any disclaimer, the term of this patent is extended or adjusted under 35 U.S.C. 154(b) by 162 days.

(21) Appl. No.: 18/687,086

(22) PCT Filed: Aug. 29, 2022

(86) PCT No.: PCT/US2022/041911
§ 371 (c)(1),
(2) Date: Feb. 27, 2024

(87) PCT Pub. No.: WO2023/034223
PCT Pub. Date: Mar. 9, 2023

(65) Prior Publication Data

US 2024/0372484 A1 Nov. 7, 2024

Related U.S. Application Data

(60) Provisional application No. 63/238,210, filed on Aug. 29, 2021.

(51) Int. Cl.
*H02M 3/158* (2006.01)
*H02M 1/38* (2007.01)

(52) U.S. Cl.
CPC ............ *H02M 1/38* (2013.01); *H02M 3/158* (2013.01)

(58) Field of Classification Search
CPC ................................ H02M 7/48; H02M 1/38
See application file for complete search history.

(56) References Cited

U.S. PATENT DOCUMENTS 5,539,630 A 7/1996 Pietkiewicz et al.
7,064,497 B1 6/2006 Hsieh
(Continued)

OTHER PUBLICATIONS

International Search Report and Written Opinion received for PCT Patent Application No. PCT/US22/41911, mailed on Dec. 29, 2022, 13 pages.

*Primary Examiner* — Peter M Novak
(74) *Attorney, Agent, or Firm* — Workman Nydegger

(57) ABSTRACT

Modulation of switching intervals over a line cycle in an inverter system is provided. In one embodiment, an inverter circuit includes input and output ports, first and second switches. The inverter circuit provides a substantially sinusoidal output voltage or current. The first and second switches operate with a switching frequency and deadtimes. A first controller operates in conjunction with a first control loop to provide control signals for the first switch and second switch. A second controller operates in conjunction with a second control loop and adapted to provide a plurality of distinct timing parameters for a plurality of individual time periods within the line cycle of the substantially sinusoidal output voltage or current. The first controller is adapted to provide the control signals for the first switch and the second switch based in part on the timing parameters provided by the second controller.

20 Claims, 8 Drawing Sheets

Inverter building block and time interval definitions

Description of timing parameters $t_{sw} = 1/f_{sw}$ where $f_{sw}$ is the switching frequency (100 – 300kHz)
$t_L = 1/f_L$ where $f_L$ is the fundamental frequency of $v_{out}$ (60Hz)
$t_c = 1/f_c$ where $f_c$ is the sampling frequency or rate at which $d$ is varied ($f_L$ * 128)

- The switching process of a converter is inherently lossy due to parasitics and result in switching losses ($\propto f_{sw}$) that dominates the overall converter loss
- $f_{sw}$, $t_{df}$ and $t_{dn}$ are the parameters need to be optimized over a line cycle to minimize these losses and achieve "lossless" soft-switching

(56) References Cited

U.S. PATENT DOCUMENTS

| | | | | |
|---|---|---|---|---|
| 2004/0037097 | A1 | 2/2004 | Deng et al. | |
| 2010/0002480 | A1 | 1/2010 | Huynh et al. | |
| 2018/0309379 | A1 * | 10/2018 | Basic | H02M 1/15 |
| 2020/0021199 | A1 | 1/2020 | Phadke | |

* cited by examiner

Inverter building block and time interval definitions

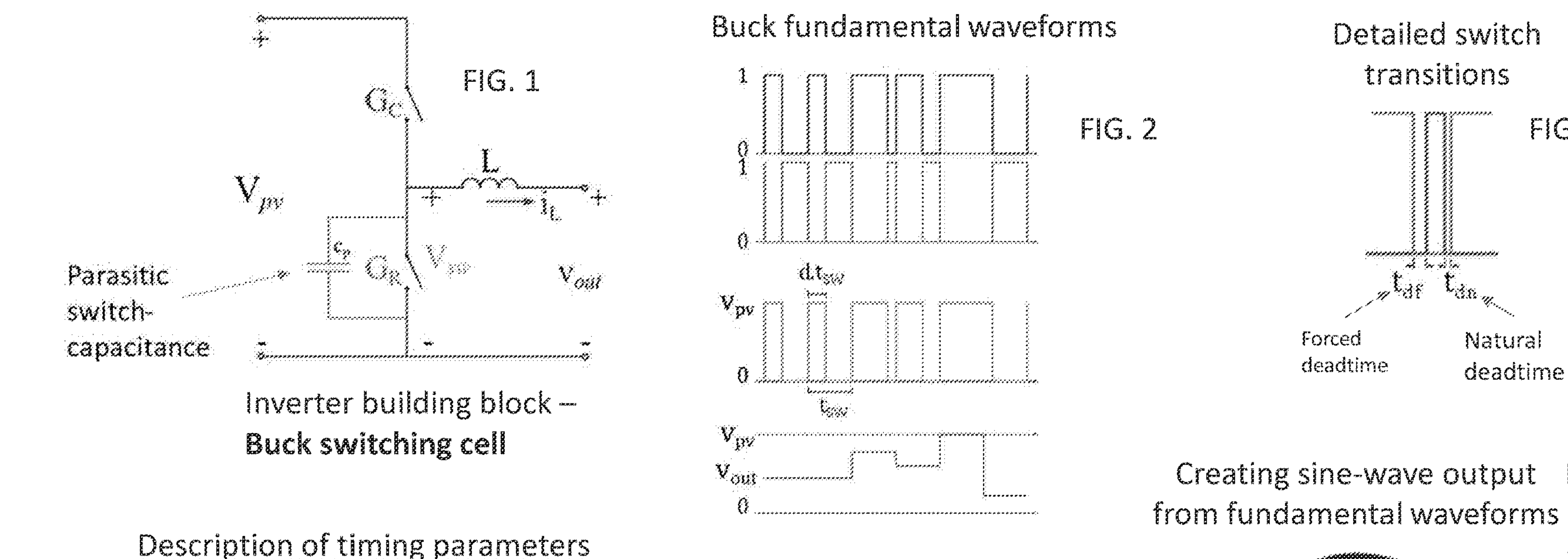

Inverter building block –
Buck switching cell

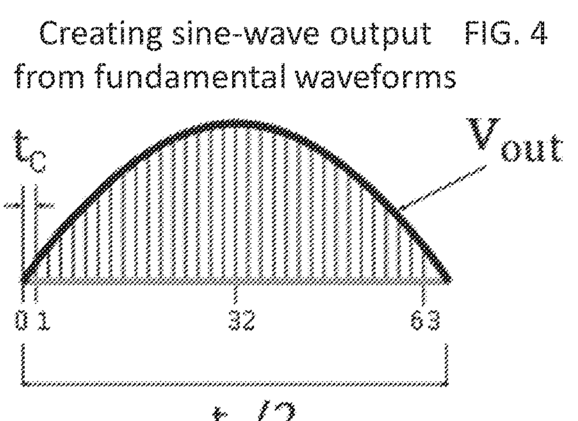

Creating sine-wave output FIG. 4
from fundamental waveforms $t_C$ $V_{out}$ 0 1 32 63 $t_L/2$ Description of timing parameters $t_{sw} = 1/f_{sw}$ where $f_{sw}$ is the switching frequency (100 – 300kHz)
$t_L = 1/f_L$ where $f_L$ is the fundamental frequency of $v_{out}$ (60Hz)
$t_c = 1/f_c$ where $f_c$ is the sampling frequency or rate at which $d$ is varied ($f_L$ * 128)

- The switching process of a converter is inherently lossy due to parasitics and result in switching losses ($\propto f_{sw}$) that dominates the overall converter loss
- $f_{sw}$, $t_{df}$ and $t_{dn}$ are the parameters need to be optimized over a line cycle to minimize these losses and achieve "lossless" soft-switching

Problem definition

Challenges

- The timing parameters shown on the right are derived analytically and involve set of equations solved numerically. Variation of both $f_{sw}$ and forced dead-time are essential
- They are a function of instantaneous values of $V_{pv}$, $i_L$ and $v_{out}$ in the line-cycle and the device parasitics.
- Multi-level inverters (our topology) introduce additional complexity in the negative half-cycle since $i_L$ flips polarity and $v_{out}$ flips shape
- Grid-tied inverters are required to push reactive power (leading or lagging) into the grid as commanded. This means a phase shift is required between $v_{out}$ and $i_L$. Changes trajectory of parameters

Impact of timing parameters

- Converter can operate with consistently high-efficiencies over wide operating ranges and differing modes with near-elimination of dominant switching loss mechanisms

FIG. 5

Example of timing modulation over half-cycle (Analytical)

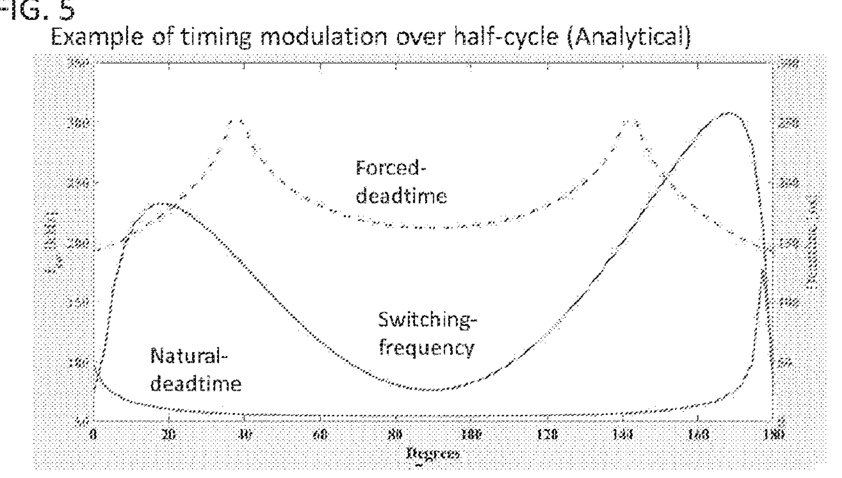

Converter output voltage/current waveforms

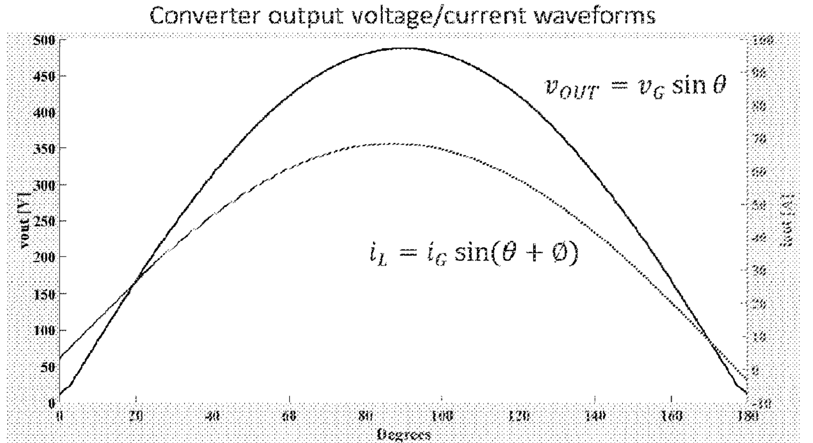

Block diagram of the approach

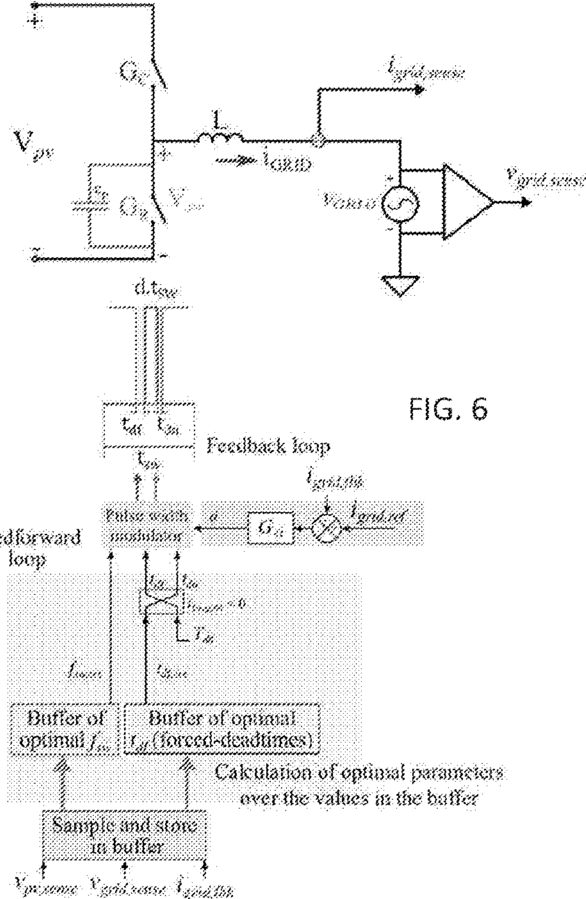

FIG. 6

Feedback loop

- Responsible for controlling the current through the inductor into the grid.
- Operates with very high bandwidth.
- Sets the duty cycle *d* for the converter.

Feedforward loop

- Captures sensed values $i_{grid}$, $v_{grid}$ into a buffer.
- Then using the value of sensed $v_{PV}$ optimal or improved and specific values of $i_{grid}$, $v_{grid}$ the constants $F_n$, $a$ and $b$ are calculated.
- The optimal/improved values of $f_{sw}$ and $t_{df}$ are calculated using these constants over all sensed values in the buffer.
- $T_{dn}$ is set to a fixed value.
- New timing parameters are calculated every positive half-cycle. The application of dead-times depend on the polarity of the sensed current. (This covers both reactive power flow and negative line cycle)

FIG. 7- Example approach

1. Record the instantaneous values of $v_{OUT}$ and $i_L$ at each sampling point of the previous positive half-cycle

| Sample (n) | 0 | 1 | 2 | 3 | --- | 63 |
|---|---|---|---|---|---|---|
| $v_{OUT.n}$ | v0 | v1 | v2 | v3 | --- | v63 |
| $i_{L,n}$ | i0 | i1 | i2 | i3 | --- | i63 |
| $m_n = \frac{v_{out,n}}{V_{PV}}$ | m0 | m1 | m2 | m3 | --- | m63 |

Compute

2. Compute the timing parameters based on the proposed formula (derived from examining the components of the analytical solution)

| | | | | | | |
|---|---|---|---|---|---|---|
| $f_n = F_b \frac{\sin(\pi . m_n)}{A.\lvert i_{L,n}\rvert + B}$ | $f_0$ | $f_1$ | $f_2$ | $f_3$ | --- | $f_{63}$ |
| $t_{df,n} = T_b \frac{1}{\lvert\cos(\pi . m_n)\rvert + 1}$ | $t_{df0}$ | $t_{df1}$ | $t_{df2}$ | $t_{df3}$ | --- | $t_{df63}$ |
| | $t_{dn0}$ | $t_{dn1}$ | $t_{dn2}$ | $t_{dn3}$ | --- | $t_{dn63}$ |

$T_b, F_b, A$ and $B$ are obtained from multivariate polynomial curve fitting of the analytical model and need to be calculated once per half-cycle $t_{dn}$ is less important in terms of efficiency and may just be to constant values The approach works irrespective of the amount of reactive power pushed into the grid i.e the $i_{L,n}$ values can be negative or positive

FIG. 8 - Extension to negative-cycle of multilevel inverter
Sample (n) 64 65 66 67 --- 127
$f_0$ $f_1$ $f_2$ $f_3$ --- $f_{63}$
The values for frequency turn out to be the same in the negative cycle samples
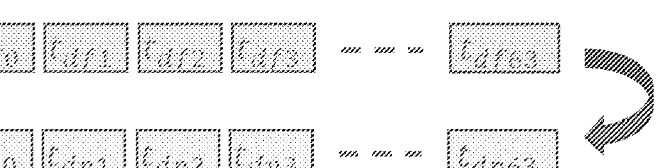
$t_{df0}$ $t_{df1}$ $t_{df2}$ $t_{df3}$ --- $t_{df63}$
$t_{dn0}$ $t_{dn1}$ $t_{dn2}$ $t_{dn3}$ --- $t_{dn63}$
Simply swap values for natural and forced ZVS deadtimes that were calculated in the positive cycle Four mode modulation waveform Average plus ripple current variation during one switching period, for the four modes of modulation Inductor Current in DCM Addition of a closed-loop current control

MODULATION OF SWITCHING INTERVALS OVER A LINE CYCLE IN A MULTILEVER INVERTER

CROSS-REFERENCES TO RELATED APPLICATIONS

This application is a U.S. National Stage of International Application No. PCT/US2022/041911, filed on Aug. 29, 2022 and entitled "MODULATION OF SWITCHING INTERVALS OVER A LINE CYCLE IN A MULTILEVEL INVERTER", which claims the benefit of and priority to U.S. Provisional Patent Application Ser. No. 63/238,210 filed on Aug. 29, 2021 and also entitled "MODULATION OF SWITCHING INTERVALS OVER A LINE CYCLE IN A MULTILEVEL INVERTER," each of the foregoing applications are expressly incorporated herein by reference in their entirety.

BACKGROUND

Field

The present disclosure relates to an inverter and a controller adapted to control one or more switch operation in the inverter.

Background

Inverter circuits are typically controlled using constant timing parameters such as their switching frequencies and deadtimes. A controller adjusts switch duty cycles to control the inverter output voltage or current, but the other timing parameters such as switching frequency and deadtimes are set to fixed values. However, these timing parameters affect important behavior, including transistor and inductor loss as well as inductor peak current and saturation. Variation of the timing parameters can improve efficiency and prevent saturation. This invention provides an improved controller system whereby timing parameters are varied along the sinusoid as well as at different operating conditions, such that the inverter performance is improved.

BRIEF SUMMARY

Modulation of switching intervals over a line cycle in an inverter system is provided.

In one embodiment, an inverter circuit includes input and output ports, first and second switches. The inverter circuit provides a substantially sinusoidal output voltage or current. The first and second switches operate with a switching frequency and deadtimes. A first controller operates in conjunction with a first control loop to provide control signals for the first switch and second switch. A second controller operates in conjunction with a second control loop and adapted to provide a plurality of distinct timing parameters for a plurality of individual time periods within the line cycle of the substantially sinusoidal output voltage or current. The first controller is adapted to provide the control signals for the first switch and the second switch based in part on the timing parameters provided by the second controller.

In one variation, wherein the timing parameters are used to determine at least one of the group comprising: a switching frequency, a switching period, and at least one switch deadtime.

In another variation, the second controller is adapted to measure instantaneous values of sinusoidal voltage and current produced by the inverter circuit in the plurality of individual time periods, record the instantaneous values and use a plurality of the recorded values to determine the timing parameters.

In yet another variation, the plurality of distinct timing parameters are predetermined and stored for individual time periods within the line cycle of the sinusoidal output voltage.

In another embodiment, A method of controlling an inverter system is provided. The method includes providing an inverter circuit comprising: an inverter input port, an inverter output port, a first switch, and a second switch. The inverter circuit is adapted to provide a substantially sinusoidal output voltage or current. The first and second switches operate with a switching frequency and deadtimes. The method includes controlling the first and second switches via control signals using a duty cycle and determining a plurality of distinct timing parameters for a plurality of individual time periods within the line cycle of the sinusoidal output voltage. The control signals for the first switch and the second switch are based in part on the timing parameters.

The foregoing and other aspects, features, details, utilities, and advantages of the present invention will be apparent from reading the following description and claims, and from reviewing the accompanying drawings.

BRIEF DESCRIPTION OF THE DRAWINGS

FIG. 1 shows an example of a buck switching cell that can be used as a basic building block of a single-phase inverter.

FIG. 2 shows an example of Buck fundamental waveforms for the example circuit shown in FIG. 1.

FIG. 3 shows a close-up view of detailed switch transitions of the waveforms shown in FIG. 2.

FIG. 4 shows an example inverter output signal in which a half of a sine wave is shown.

FIG. 5 shows a pair of graphs including a first graph showing example converter output voltage/current waveforms, and a second graph showing an example of a timing modulation over a half cycle to optimize or improve the process.

FIG. 6 is a schematic diagram of an example inverter circuit with a controller/control system adapted to control operation of the control and rectifier switches in the inverter circuit.

FIG. 7 shows an example of an approach of a controller.

FIG. 8 is a schematic diagram showing an extension to a negative half-cycle of a multilevel inverter.

DETAILED DESCRIPTION

Figure 9:
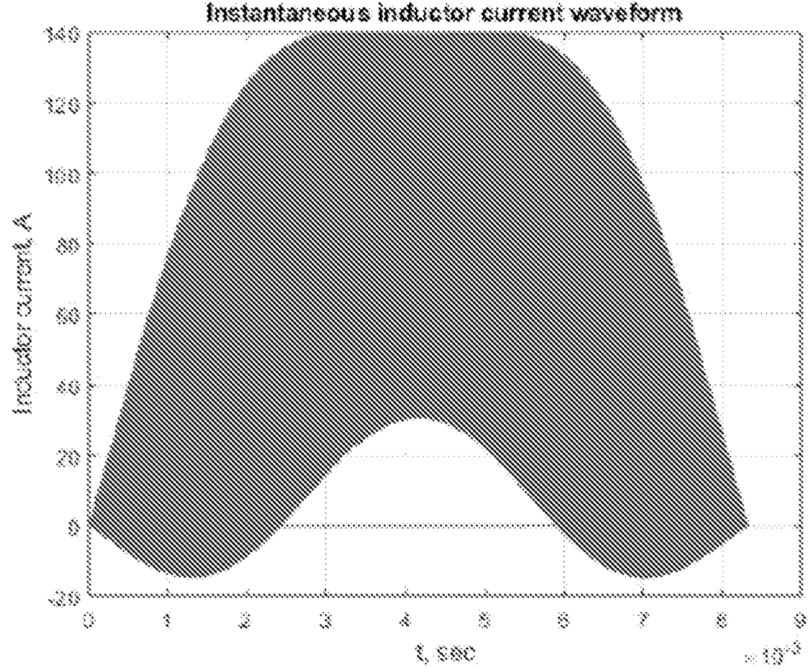
FIG. 9 illustrates an example interleave inductor current waveform that results from a modulation scheme in which a switching period varies sinusoidally along with a sine wave voltage.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a" component can include two or more such components unless the context indicates otherwise. Also, the words "proximal" and "distal" are used to describe items or portions of items that are situated closer to and away from, respectively, a user or operator such as a surgeon. Thus, for example, the tip or free end of a device may be referred to as the distal end, whereas the generally opposing end or handle may be referred to as the proximal end.

All directional references (e.g., upper, lower, upward, downward, left, right, leftward, rightward, top, bottom, above, below, vertical, horizontal, clockwise, and counter-clockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The term "substantially" as used herein may be applied to modify any quantitative representation which could permissibly vary without resulting in a change in the basic function to which it is related.

FIG. 1 shows an example of a buck switching cell that can be used as a basic building block of a single-phase inverter. The buck switching cell of FIG. 1 is merely an example of an inverter building block. This building block may be repeated to realize a three-phase inverter system. Other circuits include, but are not limited to, single and three-phase rectifiers. In the example implementation of FIG. 1, the buck switching cell includes two switches $G_C$ and $G_R$. $G_C$ is a control switch, and $G_R$ is a rectifier switch of the circuit. An inductor L is connected at a first terminal to a switch node disposed between the switches $G_C$ and $G_R$ as shown. An inductor caries an average inductor current $i_L$. An input voltage $V_{pv}$ is provided as shown. An output voltage $V_{out}$ is disposed across a second terminal of the inductor L and a neutral or ground terminal. Although the switches are shown as ideal switches, in an actual implementation the switches include parasitic capacitances, such as the parasitic capacitance $c_p$ shown with respect to the rectifier switch $G_R$.

FIG. 2 shows an example of Buck fundamental waveforms for the example circuit shown in FIG. 1. The switches of the circuit shown in FIG. 1 are controlled (turned ON and OFF) by the waveforms shown in FIG. 2. The control switch $G_C$ is controlled by the top waveform, and the rectifier switch $G_R$ is controlled by the second waveform. The control switches are controlled in a complementary manner such that if one switch is ON, the other switch is OFF, and vice versa. A control switch voltage $V_{SW}$ is shown in the third waveform. The switch-node voltage in this embodiment is a square wave that switches between 0 volts and $v_{pv}$ volts. The square wave has a time interval of $t_{sw}$ and an on-time of $d \cdot t_{sw}$, where d is a duty cycle that varies from 0 to 1. An output voltage $V_{out}$ is obtained by filtering the control switch voltage via the inductor L connected between the switch node and the output; the output voltage can vary between 0 and $v_{pv}$ and is an average value of the square wave shown in the third waveform of FIG. 2.

FIG. 3 shows a close-up view of detailed switch transitions of the waveforms shown in FIG. 2. Practical implementation includes a dead-time interval between switch transitions during which both switches are in the off position. Deadtime intervals account for turn-on/turn-off delays of the switches and prevent shoot through phenomenon (current spikes due to both switches being turned on for a small interval between transitions). In this embodiment, the two different dead-time intervals are labelled as forced deadtime and natural deadtime, respectively. In FIG. 3, the forced deadtime $t_{df}$ is a period before the control switch is turned ON, and the natural deadtime $t_{dn}$ is a period before the rectifier switch is turned ON.

FIG. 4 shows an example inverter output signal in which a half of a sine wave is shown. In this embodiment, the output voltage signal $v_{out}$ is shown by the bold line. By sinusoidally varying the duty cycle d at sampling frequency $f_C$, the inverter controller produces a sinusoidal output voltage $v_{out}$ and a sinusoidal current $i_L$.

Also shown are example timing parameters of the inverter circuit shown in FIG. 1 and the waveforms shown in FIGS. 2-4. In this embodiment, a timing parameter for the switches $t_{sw}$ is shown as $1/f_{sw}$ where $f_{sw}$ is a switching frequency of the switches. In this embodiment, the switching frequency of the switches can vary between 100 and 300 KHz. A timing parameter $t_L$ is shown as $1/f_L$ where $f_L$ is the fundamental line frequency of sinusoidal voltage and current, which in this example is 60 Hz. A timing parameter $t_C$ is shown as $1/f_C$ where $f_C$ is a sampling frequency or a rate at which the duty cycle d is varied, in this example $f_L$*128.

In the switching process of an inverter, the act of creating square waves is inherently lossy due to parasitics and results in switching losses (e.g., directly proportional to the switching frequency $f_{sw}$) that is large enough to dominate the overall inverter circuit loss. Thus, the parameters $f_{sw}$, $t_{df}$ and $t_{dn}$ are parameters that can be optimized or otherwise improved, such as over a line cycle to minimize or reduce the losses and achieve "lossless" or at least near-lossless soft-switching of the control and rectifier switches.

FIG. 5 shows a pair of graphs including a first graph showing example converter output voltage/current waveforms, and a second graph showing an example of a timing modulation over a half cycle to optimize or improve the process. In the first (bottom) graph, examples of a half-line cycle of $v_{out}$ and the inductor current $i_L$ are shown. The timing parameters shown in the second graph can be determined analytically, such as involving a set of equations solved numerically. Variation of both $f_{sw}$ and forced deadtime are performed. The switching frequency and corresponding forced and natural deadtimes are shown.

The timing parameters, in this embodiment, are a function of the instantaneous values or $V_{PV}$, $i_L$ and $v_{out}$ in the line cycle and the device parasitics.

Multi-level inverters can introduce additional complexity in the negative half-cycle since $i_L$ flips polarity and $v_{out}$ flips shape.

In one particular embodiment, grid-tied inverters can push reactive power (leading or lagging) into the grid as needed. This can be performed by a phase shift between $v_{out}$ and $i_L$ and changes a trajectory of optimal parameters.

By improving/optimizing the timing parameters, a converter can operate with consistently high efficiencies over wide operating ranges and differing modes with near elimination of dominant switching loss mechanisms. In one embodiment, for example, timing parameters may be determined and/or changed within individual time periods within a half or full AC line cycle to adjust for variations during the half or full AC line cycle. In another embodiment, predetermined timing parameters may be stored (e.g., in a buffer or in memory) for use by a controller to control the operation of the inverter circuit instead of calculating new values on the fly.

FIG. 6 is a schematic diagram of an example inverter circuit with a controller/control system adapted to control operation of the control and rectifier switches in the inverter circuit. In this embodiment, the controller comprises a feedback loop and a feedforward loop. The feedback loop is responsible for controlling current through the inductor to the output (e.g., into the grid). The feedback loop also operates at a relatively high bandwidth compared to the feedforward loop and sets the duty cycle d for the inverter.

The feedforward loop receives sensed values (e.g., $i_{grid}$ and $v_{grid}$) and places the values into buffer(s). Using the values of a sensed $v_{PV}$ and values of the $i_{grid}$, $v_{grid}$ at a specific instant in the sinusoidal line cycle, a set of constants $F_n$, a and b are determined. Using these constants and an empirical formula, optimized/improved values off, and $t_{df}$ are calculated using these constants over all sensed values in the buffer. $T_{dn}$ is set to a fixed value.

New timing parameters are calculated repeatedly, such as over every positive half-cycle. The application of deadtimes depend on the polarity of the sensed current, which covers both reactive power flow and negative line cycle.

FIG. 7 shows an example of an approach of a controller. In this embodiment, the instantaneous values of $v_{out}$ and $i_L$ are recorded at each sampling point (e.g., each sampling point of the previous half-cycle). The sampled values are fed into respective buffers as shown in FIG. 7. In this particular embodiment, for example, 64 cell buffers are used (cells 0 to 63). Multiple arrays are used for recording each instantaneous value sample at the respective sample points. The arrays are used to calculate a conversion ratio $m_n=v_{out-n}/V_{PV}$.

Optimal/improved timing parameters are then determined. In one embodiment, for example, the timing parameters a based on the formulas shown in FIG. 7.

This approach has been found to work regardless of the amount of reactive power pushed into the grid. The $i_{L,n}$ values can be negative or positive.

FIG. 8 is a schematic diagram showing an extension to a negative half-cycle of a multilevel inverter. In the negative half-cycle, a second set of buffers is provided. In this embodiment, the frequency values can be the same as in the prior positive half-cycle. The values for the natural and forced ZVS deadtimes can be swapped from the values that were calculated in the positive half-cycle.

FIGS. 1 through 8, and the accompanying description, describe a single mode control where the switching frequency is adjusted so that the minimum inductor current is close to zero at the end of each switching period. This minimizes loss in the transistors but does not address loss or saturation of the inductors.

In another embodiment, a two-mode control can be used in which a switching frequency varies along the sine wave in a pre-programmed manner. This method is described below by Eq. 1.1 and FIG. 9, and it leads to the lower efficiency curve of FIG. 11 and provides an improved curve versus a "one mode control" embodiment.

In yet another embodiment, a four-mode control can also be used as described below with respect to FIGS. 10 and 12.

Any of the single-mode, two-mode, or four-mode control schemes can be implemented with respect to FIGS. 6, 7, and 8 described above.

As described above, an inverter can employ sinusoidal modulation of the switching period. In one embodiment, for example, the switching period is varied in proportion to the ac line voltage. The switching period becomes a sinusoidal function of the ac voltage phase angle Θ according to the following:

$$Ts = T_{smin} + (T_{smax} - T_{smin})\sin(\Theta) \tag{1.1}$$

In one embodiment, the maximum switching frequency is 300 kHz (at the zero crossings of the sinusoidal ac phase voltage) and the maximum switching frequency is 150 kHz (at the peak of the voltage waveform). FIG. 9 illustrates an example interleave inductor current waveform that results from a modulation scheme in which a switching period varies sinusoidally along with a sine wave voltage. The current waveform includes an underlying 60 Hz average, plus the high frequency switching ripple that causes the envelope variation as shown in FIG. 9.

The half-bridge interleave transistors and associated inductor operate in a continuous conduction mode. Near the zero-crossings, the current ripple is greater than the average current, causing the minimum current (the "valley current") to be negative; zero-voltage switching then occurs. Near the peak, the ripple is smaller than the average, and then the valley current is positive; this leads to hard switching and increases switching loss that is a function of the valley current. The maximum current can be limited to a value that does not saturate the inductor core, and this precludes zero-voltage switching at maximum current.

Variation of the switching frequency in this way achieves a significant improvement in efficiency, relative to constant frequency operation. However, the variation defined by Eq. (1.1) is less than optimal, and significant further improvements in efficiency are possible. In particular, a "four mode modulation" approach leads to a significant improvement. FIG. 10 illustrates the resulting interleave inductor current waveform and defines the four modes.

At high currents, the peak current can be limited to limit the inductor peak flux density. This can be achieved by increasing the switching frequency to reduce the current ripple, and the circuit operates in the continuous conduction mode. Significant switching loss is incurred, based on the valley current and the switching frequency. At lower average currents, the circuit can operate in boundary conduction mode (BCM), where is current ripple is equal to (or slightly larger than) the average, so that the valley current is zero and zero-voltage switching is achieved.

A problem with boundary conduction mode is that the switching frequency is roughly proportional to the average current, and hence the switching frequency becomes large near the zero crossings. It has been shown that efficiency is improved if the circuit switches to the discontinuous conduction mode (DCM), with constant peak current. In this mode, there is an optimum peak current that maximizes efficiency, and control of the average current is achieved by variation of the switching period. With this control, the switching period is roughly proportional to the average current, and the switching frequency becomes small near the zero crossing.

The minimum switching frequency can be limited to a value that maintains accurate control of the current waveform near the zero crossing. Hence, at very low average currents a constant frequency DCM is employed, with the duty cycle used to control the average current.

Figure 11:
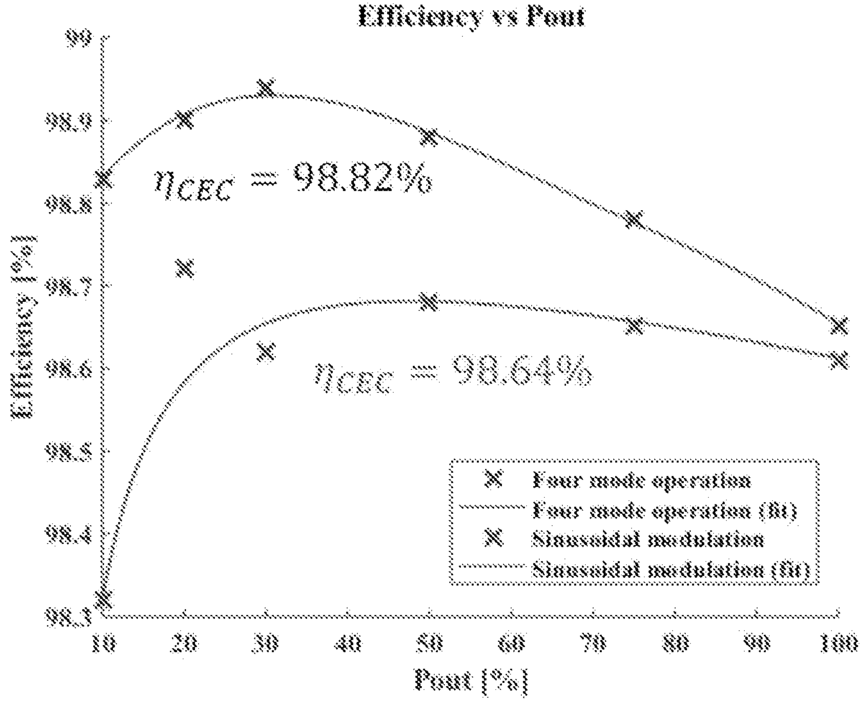
FIG. 11 illustrates a predicted efficiency improvement that could be achieved by four mode modulation.

FIG. 11 illustrates the predicted efficiency improvement that could be achieved by four mode modulation. This plot is based on our Matlab efficiency models used in earlier system design and optimizations, and which have been shown experimentally to yield reasonable accuracy.

In one embodiment, a prototype employs a five-turn planar inductor in each interleave, using an EILP 64 core having cross-sectional area $A_c$=5.19 $cm^2$. The core material is Epcos N49, with saturation flux density of 0.4 to 0.5 T. In this embodiment, the maximum winding current him is limited to limit the maximum operating flux density to 0.35 T. The air gap can be adjusted to vary the inductance and $I_{lim}$. The winding current is related to the core flux density according to:

$$B = k_B i \quad (1.2)$$

with $$k_B = L/nA_c \quad (1.3)$$

When the planar core is gapped to achieve an inductance of 7 μH, the maximum current $I_{lim}$ is found to be 130 A.

Four Mode Modulation

Figure 10:
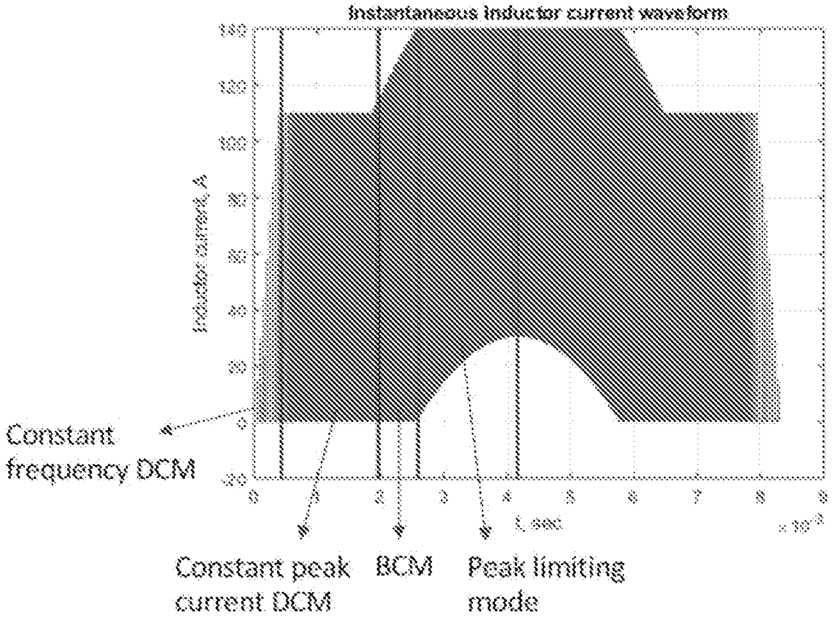
FIG. 10 illustrates the resulting interleave inductor current waveform and defines the four modes.
Figure 12:
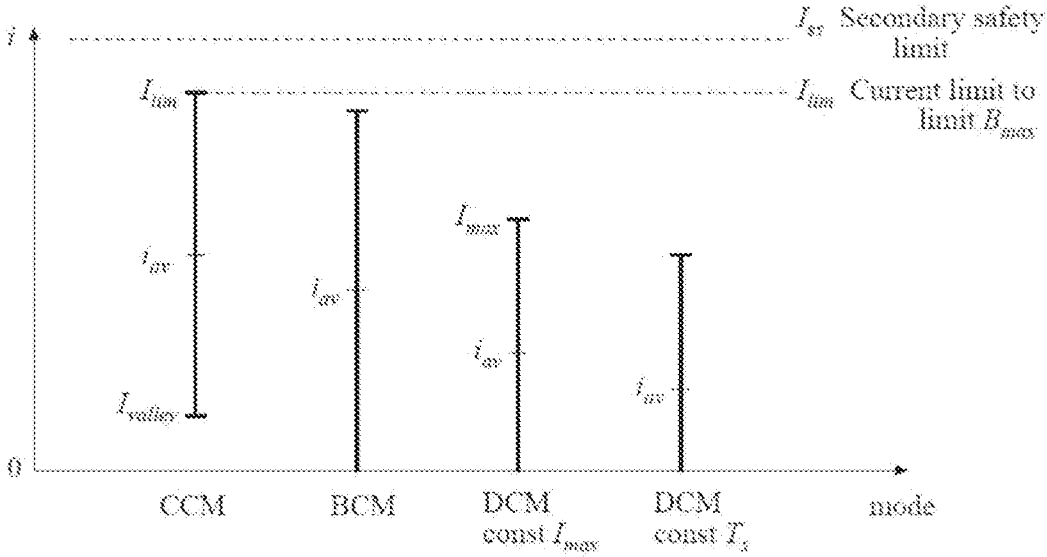
FIG. 12 illustrates the range of inductor current variation over a switching period, for each of the four modes identified in FIG. 10.

FIG. 12 illustrates the range of inductor current variation over a switching period, for each of the four modes identified in FIG. 10. FIG. 12 shows an average plus ripple current variation during one switching period, for the four modes of a modulation approach. The following describes the mode boundaries and key equations for each mode.

Continuous Conduction Mode

When the average current is high, the interleave may be required to operate in continuous conduction mode (CCM) so that the peak inductor current is limited to $I_{lim}$ and hence the inductor flux density is limited to $B_{lim}$. When the average inductor current ia, is greater than half of $I_{lim}$, then zero-voltage switching is not possible and hard-switching CCM occurs.

In CCM, the inductor current ripple of an interleave is given by $$\Delta i = DT_s\big((Vdc - vac)/2L\big) \quad (2.1)$$

Where D is the duty cycle, $V_{dc}$ is the dc voltage at the dc input to the interleave (half of the PV input voltage), and $v_{ac}$ is the ac line-to-neutral output voltage. This current ripple relates the peak and valley currents to the average:

$$I_{lim} = i_{av} + \Delta i \quad (2.2)$$

$$I_{valley} = i_{av} - \Delta i \quad (2.3)$$

In the continuous conduction mode, the duty cycle is related to the voltages according to:

$$D = v_{ac}/V_{dc} \quad (2.4)$$

This equilibrium expression is valid to the extent that the interleave operates near steady state, which is true here because the 60 Hz variations of vac are much slower than the inductor dynamics. Equations (2.4), (2.1), (1.4), and (1.3) can be combined to find the switching period in this mode, leading to $$T_{slim} = (2L(I_{lim} - i_{av}))/D(V_{dc} - v_{ac})) \quad (2.5)$$

The four mode controller employs this mode when $$i_{av} > 1/2\, I_{lim} \quad (2.6)$$

Boundary Conduction Mode

Operation in boundary conduction mode (BCM) achieves zero-voltage switching and is advantageous at currents somewhat lower than the mode boundary defined in Eq. (2.6). In BCM, the valley current is zero (or slightly negative), and the peak current satisfies $$I_{lim} > I_{pk} = 2i_{av} \quad (2.7)$$

In BCM, the duty cycle again is given by Eq. (2.4). The peak current is $$I_{pk} = DT_s(Vdc - vac)/L \quad (2.8)$$

The above equations can be used to show that the switching period in BCM is given by $$T_s = i_{av} 2L\,V_{dc}/(v_{ac}(V_{dc} - v_{ac})) \tag{2.9}$$

Discontinuous Conduction Mode, Constant $I_{max}$

Equation (2.9) shows that the BCM switching period is proportional to $i_{av}$. In consequence, the switching frequency tends to a large value as the current approaches the zero crossing. This causes low efficiency during switching periods in the vicinity of the zero crossing. The loss can be reduced by operating in the discontinuous conduction mode, at lower frequencies and with discontinuous intervals where both transistors of the half bridge are off.

For given transistors and a given inductor operating in DCM, there is an optimum value of the peak current that maximizes efficiency. The value of this peak current can be determined empirically or with a calibrated loss model. This optimum peak current can be denoted as Imax, and Imax treated as a given constant parameter. Then the controller should transition from BCM into DCM when $$2i_{av} < I_{max} \tag{2.10}$$

Figure 13:
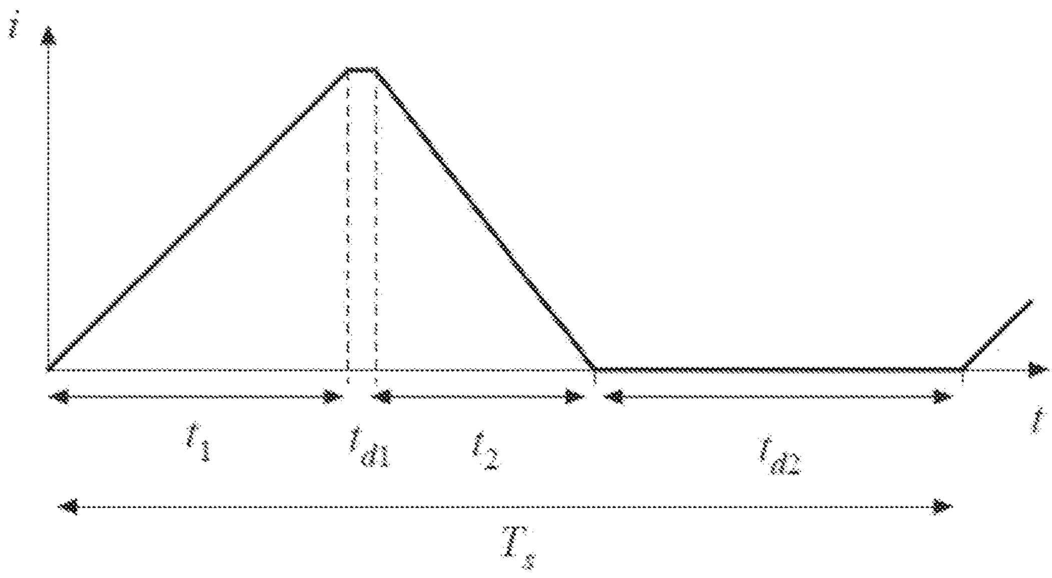
FIG. 13 shows an inductor current waveform for DCM operation.

The inductor current waveform for DCM operation is illustrated in FIG. 13. The first interval of length $t_1$ is customarily denoted of length DTs, and the switching period has length $T_s$. The microcontroller also allows the "dead times" $t_{d1}$ and $t_{d2}$ to be programmed, during which both transistors are commanded to be off. An interrupt service routine (ISR) can command the values of $t_1$, $T_s$, $t_{d1}$, and $t_{d2}$, and then the remaining time is $t_2 = T_s - t_1 - td1 - td2$. For operation in CCM, the delay times are set to minimum reliable values, while we lengthen $t_{d2}$ when we want to force the operation of the half bridge into DCM.

The solution for the waveforms in DCM can be solved, but operation with constant peak current and variation of the switching period to control the average current includes solving the equations to find different quantities. To achieve the optimum peak current, the transistor on time should be selected according to $$t_1 = LI_{max}/(V_{dc} - v_{ac}) \tag{2.11}$$

To achieve the desired average current $i_{av}$, the switching period should be selected according to $$T_s = \left(\frac{1}{2} LI_{max}^2 Vdc\right)/(i_{av} v_{av}(V_{dc} - v_{ac})) \tag{2.12}$$

The dead time $t_{d1}$ can be chosen to be the minimum, i.e., the same as for CCM. The time $t_2$ can be shown to be $$t_2 = LI_{max}/v_{ac} \tag{2.13}$$

Hence, the discontinuous interval duration should be selected according to $$t_{d2} = T_s - t_1 - t_{d1} - t_2 \tag{2.14}$$

Discontinuous Conduction Mode, Constant $T_{smax}$

For the constant $I_{max}$ DCM, Eq. (2.12) predicts that the switching frequency should go to zero as $i_{av}$ approaches zero. This leads to poor control of the current waveform near the zero crossing. This problem can be mitigated by limiting the maximum switching period $T_s$ and operating in conventional fixed-frequency DCM for low values of $i_{av}$. A minimum switching frequency of, say, 50 kHz, can be chosen leading to a maximum switching period of $T_{smax}$=20 sec.

Solution of the DCM equations for this case shows that, to obtain a given average current $i_{av}$, the transistor on time should be chosen as $$t_1 = \sqrt{\frac{i_{av} v_{ac} 2LT_{smax}}{V_{dc}(V_{dc} - v_{ac})}} \tag{2.15}$$

A math coprocessor or another method to approximate Eq. (2.15) can be used to evaluate the square root function.

Given a solution for $t_1$, t2 can be determined according to $$t_2 = t_1((V_{dc} - v_{ac})/v_{ac}) \tag{2.16}$$

The discontinuous interval length $t_{d2}$ is then found using $$t_{d2} = T_{smax} - t_1 - t_{d1} - t_2 \tag{2.17}$$

Summary of Mode Boundaries

The four-mode controller switches between modes according to the following chain: The controller operates in CCM when $$i_{av} > \frac{1}{2} I_{lim} \tag{2.18}$$

The controller operates in BCM when $$\frac{1}{2} I_{lim} > i_{av} > \frac{1}{2} I_{max} \tag{2.19}$$

The controller operates in constant $I_{max}$ DCM when $$\frac{1}{2} I_{max} > i_{av} > \frac{\frac{1}{2} LI_{max}^2 V_{dc}}{v_{ac}(V_{dc} - v_{ac})T_{smax}} \tag{2.20}$$

The controller operates in constant $T_{smax}$ DCM when $$\frac{\frac{1}{2} LI_{max}^2 V_{dc}}{v_{ac}(V_{dc} - v_{ac})T_{smax}} > i_{av} \tag{2.21}$$

Closed Loop Control

The equations of 2.1 through 2.21 can be used in an interrupt service routine to generate the values of $t_1$, $t_{d1}$, $t_{d2}$, and $T_s$ to send to the pulse-width modulator, given knowledge of the voltages $V_{dc}$ and vac, as well as the desired current $i_{av}$. This would lead to a quasi-open-loop mode controller.

Figure 14:
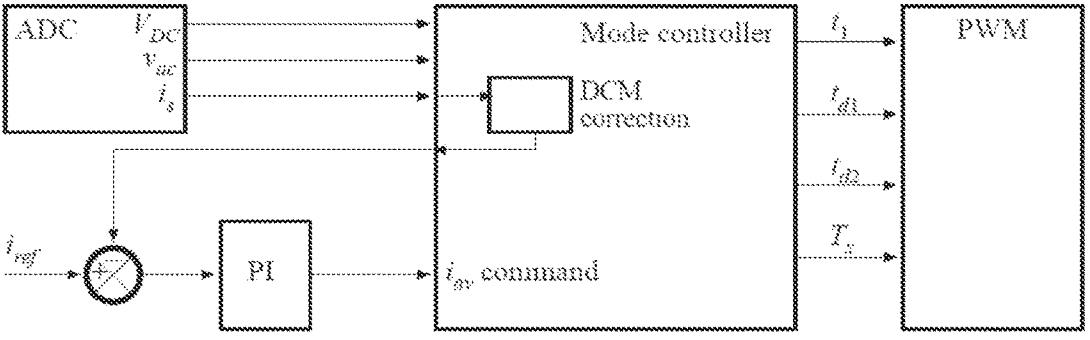
FIG. 14 is a block diagram illustrating an addition of a closed-loop current control.

To extend to closed-loop control of the inductor current, a proportional plus integral (PI) controller that adjusts the average current command based on the sensed actual current can be added. A block diagram is illustrated in FIG. 14. In this scheme, the analog to digital converter (ADC) continually samples the voltages Vdc and vac, as well as the sampled inductor current is. Our code is calibrated to sample the inductor current at the center of the transistor conduction interval; in CCM and BCM, this sampled current coincides with the average of the current. However, in DCM the sampled current is differs from the actual average current because of the discontinuous interval. Hence, a correction factor is applied according to:

$$\text{sensed average current} = \begin{cases} i_s & \text{for } CCM \text{ or } BCM \\ i_s\left(1 - \frac{t_{d2}}{T_s}\right) & \text{for } DCM \end{cases} \quad (3.1)$$

In practice, the DCM correction, PI controller, and mode controller blocks could be implemented in the same ISR.

What is claimed is:

1. An inverter system comprising:

an inverter circuit comprising an inverter input port and an inverter output port, the inverter circuit adapted to provide a substantially sinusoidal output voltage or current;

a first switch;

a second switch, wherein the first and second switches operate with a switching frequency and deadtimes;

a first controller adapted to operate in conjunction with a first control loop to provide control signals for the first switch and second switch; and a second controller adapted to operate in conjunction with a second control loop and adapted to provide a plurality of distinct timing parameters for a plurality of individual time periods within a line cycle of the substantially sinusoidal output voltage or current, wherein the first controller is adapted to provide the control signals for the first switch and the second switch based in part on the timing parameters provided by the second controller, wherein the timing parameters are used to determine at least one of the group comprising: a switching frequency, a switching period, and at least one switch deadtime;

wherein the switching period and deadtime timing parameters are determined so that the inverter circuit operates in discontinuous conduction mode (DCM) for a portion of an AC line cycle;

wherein the inverter circuit operates in boundary conduction mode (BCM) for a portion of an AC line cycle; and wherein the timing parameters are adapted such that a peak current of the inverter circuit is constant.

2. The inverter system of claim 1, wherein the inverter circuit is adapted to provide reactive power into a grid.

3. The inverter system of claim 1, wherein the plurality of distinct timing parameters are predetermined and stored for individual time periods within the line cycle of the sinusoidal output voltage.

4. The inverter system of claim 1, wherein the second controller is adapted to measure instantaneous values of sinusoidal voltage and current produced by the inverter circuit in the plurality of individual time periods, record the instantaneous values and use a plurality of the recorded values to determine the timing parameters.

5. The inverter system of claim 4, wherein the second controller determines the timing parameters during a plurality of positive half-cycles of the line cycle.

6. The inverter system of claim 4, wherein the second controller determines new timing parameters upon a predetermined change in operating conditions of the inverter circuit.

7. The inverter system of claim 4, wherein the recorded values are stored in at least one buffer.

8. The inverter system of claim 4, wherein the timing parameter is calculated for a positive half cycle and due to positive/negative half-cycle symmetry in multilevel inverters, a first deadtime timing parameter value is swapped with a second deadtime parameter value for the first and second switches during a negative half cycle.

9. The inverter system of claim 4, wherein the second controller is adapted to calculate the timing parameters with varying input voltage and varying grid voltages and currents.

10. The inverter system of claim 4, wherein the instantaneous values are recorded in a buffer for each half cycle and the timing parameters are determined for a next cycle.

11. The inverter system of claim 10, wherein the timing parameters are determined using an empirical formula and time varying constants.

12. An inverter system comprising:

an inverter circuit comprising an inverter input port and an inverter output port, the inverter circuit adapted to provide a substantially sinusoidal output voltage or current;

a first switch;

a second switch, wherein the first and second switches operate with a switching frequency and deadtimes;

a first controller adapted to operate in conjunction with a first control loop to provide control signals for the first switch and second switch; and a second controller adapted to operate in conjunction with a second control loop and adapted to provide a plurality of distinct timing parameters for a plurality of individual time periods within a line cycle of the substantially sinusoidal output voltage or current, wherein the first controller is adapted to provide the control signals for the first switch and the second switch based in part on the timing parameters provided by the second controller, wherein the timing parameters are used to determine at least one of the group comprising: a switching frequency, a switching period, and at least one switch deadtime, wherein the switching period timing parameter is varied in proportion to the substantially sinusoidal output voltage or current, and wherein under normal operating conditions the switching period is controlled to be a sinusoidal function of an ac voltage phase angle Θ according to the following: Ts=Tsmin+(Tsmax−Tsmin) sin (Θ).

13. The inverter system of claim 12, wherein at high current the switching period is reduced to reduce current ripple and avoid saturation of an inductor of the inverter circuit.

14. The inverter system of claim 12, wherein the plurality of distinct timing parameters are predetermined and stored for individual time periods within the line cycle of the sinusoidal output voltage.

15. The inverter system of claim 12, wherein the second controller is adapted to measure instantaneous values of sinusoidal voltage and current produced by the inverter circuit in the plurality of individual time periods, record the instantaneous values and use a plurality of the recorded values to determine the timing parameters.

16. The inverter system of claim 15, wherein the second controller determines the timing parameters during a plurality of positive half-cycles of the line cycle.

17. The inverter system of claim 15, wherein the instantaneous values are recorded in a buffer for each half cycle and the timing parameters are determined for a next cycle.

18. The inverter system of claim 15, wherein the timing parameter is calculated for a positive half cycle and due to positive/negative half-cycle symmetry in multilevel inverters, a first deadtime timing parameter value is swapped with a second deadtime parameter value for the first and second switches during a negative half cycle.

19. The inverter system of claim 15, wherein the second controller is adapted to calculate the timing parameters with varying input voltage and varying grid voltages and currents.

20. A method of controlling an inverter system comprising:

providing an inverter circuit comprising:

an inverter input port and an inverter output port, the inverter circuit adapted to provide a substantially sinusoidal output voltage or current;

a first switch; and a second switch, wherein the first and second switches operate with a switching frequency and deadtimes;

controlling the first and second switches via control signals using a duty cycle; and determining a plurality of distinct timing parameters for a plurality of individual time periods within a line cycle of the sinusoidal output voltage, wherein the control signals for the first switch and the second switch are based in part on the timing parameters, using the timing parameters to determine at least one of the group comprising: a switching frequency, a switching period, and at least one switch deadtime, determining the switching period and deadtime timing parameters so that the inverter circuit operates in discontinuous conduction mode (DCM) for a portion of an AC line cycle;

operating the inverter circuit in boundary conduction mode (BCM) for a portion of an AC line cycle; and adapting the timing parameters such that a peak current of the inverter circuit is constant.

* * * * *